Nov. 11, 1969    L. L. PREM ET AL    3,478,234
ALTERNATING CURRENT MAGNETOHYDRODYNAMIC GENERATOR
Filed April 10, 1967
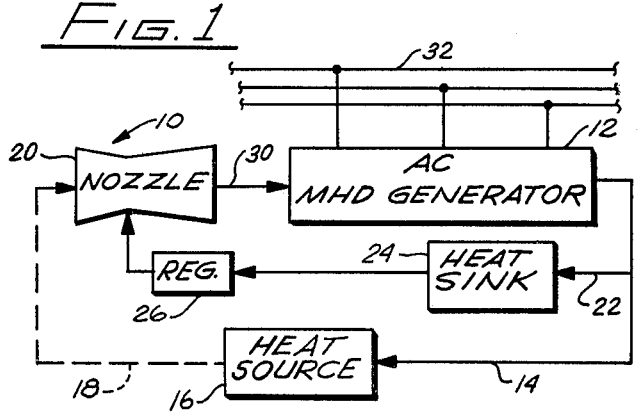
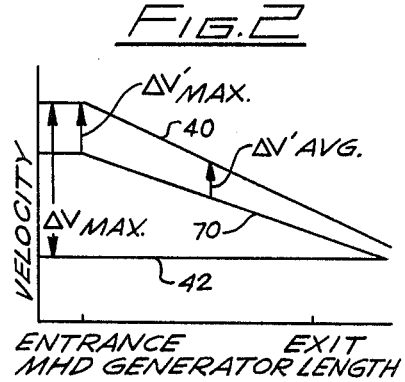
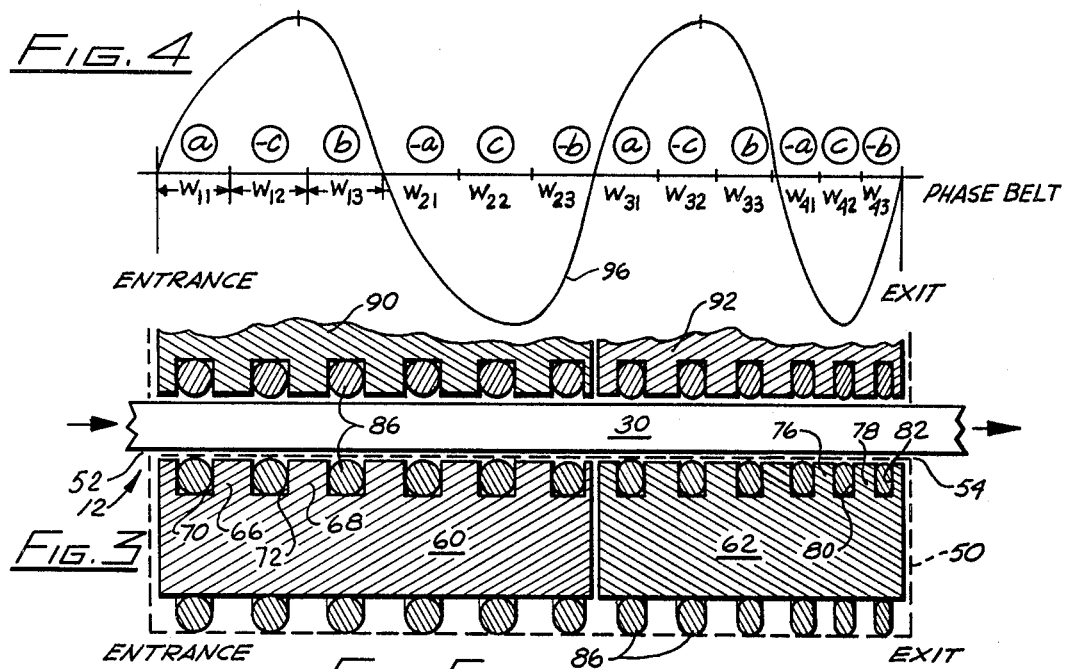
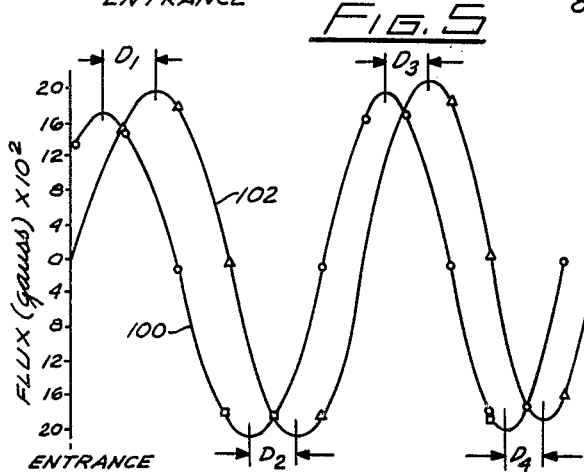
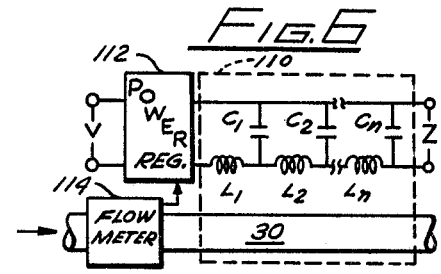
INVENTORS.
LAWRENCE L. PREM
TSIH-CHANG WANG
BY Donald J. Ellingsberg United States Patent Office 3,478,234
Patented Nov. 11, 1969

3,478,234
**ALTERNATING CURRENT MAGNETOHYDRO-
DYNAMIC GENERATOR**
Lawrence L. Prem, Tarzana, and Tsih-Chang Wang, Santa
Monica, Calif., assignors to North American Rockwell
Corporation, a corporation of Delaware
Filed Apr. 10, 1967, Ser. No. 629,661
Int. Cl. H02k 45/00
U.S. Cl. 310—11                                        5 Claims

ABSTRACT OF THE DISCLOSURE

An improved stator region for an alternating current magnetohydrodynamic generator that develops a travelling magnetic wave having a velocity that continuously decreases asymmetrically from the entrance region to the downstream exit region of the generator and corresponds to the velocity profile of a working fluid passing through the generator so that substantially constant pressure is developed in the working fluid.

CROSS REFERENCE TO RELATED APPLICATIONS

Copending application: S.N. 582,878 filed Sept. 29, 1966, Prem and Wang; assigned to the same assignee as the present invention.

BACKGROUND OF THE INVENTION

The invention relates to magnetohydrodynamic generators, and more particularly to an improved alternating current magnetohydrodynamic (MHD) generator.

Conventional MHD generators generate direct electrical current by converting the kinetic energy of an electrically conductive working fluid into electrical energy by moving the working fluid through a primary or applied magnetic field that is set up across the MHD generator. The interaction of the moving fluid and the primary magnetic field induces an electrical field with a direct current flow in a direction that is mutually perpendicular to both the direction of fluid motion and the magnetic field. The direct current flow is collected by suitable electrodes spaced apart within the MHD generator which are electrically connected to an external load in a conventional manner.

There are several disadvantages in the conventional direct current MHD generators. Direct current, with the exception of a few industrial applications, is not useful for most commercial and industrial applications where the desirable form of electrical energy is alternating electrical current. Direct current MHD generators, therefore, need inverter equipment to convert the direct current to alternating current. However, inverter equipment is complex and expensive, and therefore the cost per kilowatt hour is substantially increased. Additionally, inverter equipment introduces an unwanted power loss during the conversion from direct to alternating current.

Another disadvantage in a direct current MHD generator is that the electrical current is collected by electrodes that are physically positioned within the MHD generator and exposed to the working fluid passing through the generator. This direct contact with the working fluid presents a severe materials problem since the working fluid rapidly erodes the electrodes. Frequent replacement of the electrodes is therefore necessary. In addition, the positive electrode generally must be at an operating temperature where it will be a good electron emitter. However, the electrodes can not be conveniently cooled in a direct current MHD generator because a low temperature region near the electrodes introduces a high electrical resistivity with a corresponding high power loss.

These disadvantages with direct current MHD power generation led to the development of MHD generators that generate alternating current and thereby eliminate inverter equipment. The alternating current MHD generators known in the prior art also eliminate electrodes by using inductive coupling. The principle of operation of these alternating current or induction MHD generators is essentially that of well-known rotating induction machinery. In alternating current MHD generators, the primary magnetic field of a direct current MHD generator is replaced with a set of field windings that are sequentially energized to set up a magnetic field that moves as a travelling wave in the direction of the working fluid flow through the generator. The travelling magnetic wave that is setup by the sequentially energized field windings develops circulating electrical currents in the moving working fluid. The interaction of these circulating currents with the stator windings through inductive coupling converts the mechanical energy of the working fluid into electrical energy when the velocity of the working fluid is greater than that of the travelling magnetic field. This difference between the working fluid velocity and the velocity of the travelling magnetic wave is known as slip. The slip should be constant and preferably small for the efficient generation of power.

Alternating current MHD generators can be classified as constant fluid velocity generators where the pressure of the working fluid is converted to electrical energy, or constant pressure generators where the kinetic energy of the working fluid is converted to electrical energy. While it is generally assumed that the working fluid velocity through a plasma MHD generator is constant, this is not a valid assumption for a liquid metal MHD generator. In actual practice, the working fluid velocity decreases as the fluid passes through the MHD generator. When the externally developed travelling magnetic field moves at a constant speed, the known MHD generators of the prior art experience a variable slip from the entrance region of the MHD generator to the exit region. Therefore, it is desirable to develop a travelling magnetic field that moves at a variable speed from entrance region to exit region so that the slip variation from the entrance to the exit is substantially reduced and becomes more nearly constant.

OBJECTS OF THE INVENTION

Accordingly, it is an object of the invention to provide a new and improved alternating current MHD generator.

It is also an object of the invention to provide a new and improved alternating current MHD generator having an improved stator region.

Another object of the invention is to provide an alternating current MHD generator having an improved stator region to set up a travelling magnetic field having a variable magnetic field velocity.

A further object of the invention is to provide an alternating current MHD generator that generates electrical power at increased efficiency.

Yet another object of the invention is to provide an alternating current MHD generator that has a substantially constant electrical power output per channel unit volume.

It is another object of the invention to provide an alternating current MHD generator that has substantially constant efficiency throughout the channel length.

SUMMARY OF THE INVENTION

Briefly, in accordance with one form of the invention, a new and improved alternating current magnetohydrodynamic generator is provided having a stator region with a generator section core means that generally defines entrance and exit regions. At least first and second stator means cooperate with the generator section core means and when connected to a suitable source of electrical power develop at least first and second stator phase belts that are continuously decreasing dimensionally from the entrance region to the downstream exit region so that the velocity of a resulting travelling magnetic wave set up by the stator means continuously decreases asymmetrically from the entrance region to the downstream exit region. The continuously decreasing velocity of the travelling magnetic field corresponds to the continuously decreasing velocity of a working fluid passing through the generator so that the slip speed variation from the entrance to the exit becomes substantially constant resulting in the efficient generation of the electrical power by the MHD generaor.

Further objects, features, and the attending advantages of the invention will become apparent when the following description is read in view of the accompanying drawings.

BRIEF DESCRIPTION OF THE DRAWING

FIGURE 1 is a schematic of an alternating current MHD generator system;

FIGURE 2 is a graph of both the variable slip developed by known prior art forms of alternating current MHD generators and the substantially constant slip developed by the improved stator region for an alternating current MHD generator formed in accordance with the invention;

FIGURE 3 is a schematic of one form of improved stator region of the invention;

FIGURE 4 is a graph of the continuously decreasing stator phase belts and asymmetric magnetic wave developed by the stator region of FIGURE 3;

FIGURE 5 is a graph showing recorded asymmetrical travelling magnetic waves developed by one form of stator region formed in accordance with the invention; and FIGURE 6 is a schematic of another form of stator region formed in accordance with the invention.

DESCRIPTION OF THE INVENTION

Referring to FIGURE 1, an example of one form of alternating current MHD generator system 10 in which the new and improved alternating current MHD generator 12 of the invention can find use has a conduit 14 that introduces an electrically conductive working fluid containing one or more components, at least one of which is vaporizable, into a suitable and conventional heat source 16. The working fluid is raised to a temperature equal to or higher than the vaporization temperature thereof by the heat source 16 so that the working fluid is partially vaporized and in the system 10 as shown becomes a two-phase mixture, i.e., having both vapor and liquid phases. The vapor phase of the conductive fluid, shown by dashed line 18, passes to a nozzle means 20 which increases the kinetic energy of the working fluid. The vapor phase entering the nozzle 20 can be either wet, saturated, or superheated. The nozzle 20 converts the energy of the partially vaporized working fluid into kinetic energy so that a high velocity, working fluid stream results.

In the alternating current MHD generator system 10 as shown by FIGURE 1, a liquid portion of the working fluid passing through conduit 14 to the heat source 16 is fed through conduit 22 to a conventional heat sink 24 which subcools the liquid. A separate source of liquid is also contemplated. The subcooled liquid is conducted through a pressure or flow regulator 26 and injected into the nozzle 20 so that the kinetic energy of the driving stream is transferred to the subcooled liquid. The pressure or flow regulator 26 controls the conditions for the injection of the subcooled liquid into the vapor stream in nozzle 20. The resulting fluid, which initially contains both liquid and vapor phases of the working liquid, is in a form that can generally be described as a fog. A free exchange of thermal energy occurs between the two phases when they are maintained in this condition for a sufficient time. This insures that the greater or entire portion of the vapor is condensed by the mass heat transfer with the subcooled liquid and also that the kinetic energy of the vapor is transferred to the subcooled liquid. The resulting working fluid passing from nozzle 20 through conduit or channel 30 to the alternating current MHD generator 12 of the invention consists essentially of the liquid phase and is, therefore, an electrically conductive fluid. The electrically conductive working fluid passes through the alternating current MHD generator 12 where the kinetic energy of the working fluid stream is converted to electrical energy. The electrical energy that is generated by the alternating current MHD generator 12 is fed to a conventional polyphase bus bar such as the three-phase bus bar 32.

Although FIGURE 1 shows a closed fluid cycle, it is contemplated that the alternating current MHD generator system 10 can also cooperate with an open cycle system in a conventional manner. It is also contemplated that the alternating current MHD generator of the invention can find use with other magnetohydrodynamic generator systems than that illustrated by FIGURE 1.

Referring to FIGURE 2, there is a proportional change in working fluid velocity from the entrance to the exit regions of an alternating current MHD generator as illustrated, for example, such as a proportional decrease in working fluid velocity as shown by the linear working fluid velocity curve 40. It is contemplated that programmed working curves other than linear curve can also be used. Prior art forms of MHD generators set up a constant velocity travelling magnetic wave 42 by the energization of suitable stator windings in the MHD generator. The difference between the working fluid velocity as illustrated by curve 40 and the travelling magnetic field velocity as illustrated by curve 42 is large at the entrance region to the MHD generator region; this difference is designated as $\Delta V_{MAX}$. $\Delta V_{MAX}$ can be considered as representing a maximum slip. However, the velocity of the working fluid continuously decreases from the entrance to the exit regions—illustrated by FIGURE 2 as a linear decrease whereas it can be other than linear—so that the velocity of the working fluid 40 at the exit region of the MHD generator is substantially equal to the velocity of the travelling magnetic wave 42 at the exit region. The $\Delta V_{MAX}$, therefore, has approached, or is at, zero. Consequently, a variable slip rather than a constant slip is developed by prior art MHD generators between the entrance and exit regions. As previously indicated, this substantially decreases the efficiency of the MHD generator for electrical power generation.

Referring now to FIGURE 3, the improved alternating current MHD generator 12 of FIGURE 1 is shown having one form of an improved stator region 50 formed in accordance with the invention. Conduit or channel 30 passes the electrically conductive working fluid through the generator 12 perpendicular to a plane defined by the stator region 50 and perpendicular to a primary magnetic field that is set up generally across the stator region by a conventional magnetic means such as magnetic poles (not shown) that are spaced apart by the conduit and positioned generally normal to the plane of the drawing. The fluid flow, the stator region, and the primary magnetic field, therefore, are mutually, perpendicular in accordance with conventional MHD generator principles. The stator region 50, and the magnetic means also, generally defines an entrance region 52 spaced apart by the stator region from a downstream exit region 54 in the MHD generator 12.

The one form of improved stator region 50 of the MHD generator 12 as shown by FIGURE 3 has separate magnetic pole pair generator sections 60 and 62. It is contemplated that the successive generator sections 60 and 62 can also be positioned on a single generator section core. It is also contemplated that the improved stator region of the alternating current MHD generator can have other than the two generator sections as shown, and that part of a generator section can be used when a fractional part of a wavelength is desired.

The successive toothed generator sections 60 and 62 as shown by FIGURE 3 have a plurality of alternate teeth and slots that are individually continuously decreasing dimensionally in width from the entrance region 52 to the exit region 54. Thus, tooth 66 of generator section 60 has a dimensional width that is greater than adjacent downstream tooth 68, and correspondingly slot 70 is dimensionally wider than adjacent downstream slot 72. Similarly, the teeth and slots of generator section 62 continuously decrease so that tooth 76 of generator section 62 has a dimensional width that is greater than adjacent downstream tooth 78, and correspondingly slot 80 is dimensionally wider than adjacent downstream slot 82. It is contemplated that several adjacent teeth in a toothed generator section can have the same dimensional width, which is also contemplated for several adjacent slots, before the dimensional width changes for the next adjacent teeth or slots, or both.

The successive generator sections 60 and 62 as shown by FIGURE 3 are suitably wound in a conventional manner with stator windings, such as similar "doughnut-shape" windings 86 positioned in the slots; for example, slots 70 and 72 as shown. The stator windings 86 are connected as a three-phase stator winding having phases $a$, $b$, and $c$ for each generator section 60 and 62, and suitably connected to a polyphase bus bar (not shown), such as the polyphase bus bar 32 as shown by FIGURE 1.

Generator sections 90 and 92 as shown by FIGURE 3 complement and are similar to generator sections 60 and 62 as described.

Referring to FIGURES 3 and 4, when the stator windings 86 of generator sections 60, 62, 90, and 92 are energized, the one form of improved stator region 50 of the MHD generator 12 develops at a time instant ($wt_0$), for example, the resultant magnetic field distribution as shown by substantially asymmetrical curve 96 of FIGURE 4; asymmetry exaggerated for purposes of illustration. Asymmetrical curve 96 represents the magnetic field velocity which, in the form of stator region shown, is continuously decreasing from a high velocity at the entrance region 52 to a lower velocity at the exit region 54 because each of the improved generator sections 60, 62, 90, and 92 of the invention has a plurality of teeth and slots that are continuously decreasing dimensionally as described and shown by FIGURE 3. Corresponding stator phase belts defined by the teeth, slots and stator windings—phase belt $w_{11}$ generally corresponds to tooth 66 and slot 70 of generator section 60, and phase belt $w_{43}$ corresponds to tooth 78 and slot 82 of generator section 62, all with associated stator windings 86—as shown by FIGURE 4 are also continuously decreasing so that phase belt $w_{11}$ is dimensionally greater than phase belt $w_{12}$ which in turn is greater than $w_{13}$ . . ., and $w_{42}$ is greater than $w_{43}$. Since the improved stator region 50 develops continuously decreasing stator phase belts, such as phase belts $w_{11}$ to $w_{43}$ as shown by FIGURE 4, the velocity of the resulting travelling magnetic wave, such as asymmetrical curve 96, continuously decreases through the channel 30 from the entrance region 52 to the exit region 54. This results in a uniform power density and substantially constant pressure in the working fluid throughout the length of the stator region 50 of the alternating current MHD generator 12.

Referring again to FIGURE 2, the continuously decreasing asymmetrical travelling magnetic wave 96 of FIGURE 4 is expressed by FIGURE 2 as magnetic velocity curve or profile 70. The maximum velocity $\Delta V'_{MAX}$ of velocity curve 70 is at the entrance region 52 and is the measured distance between the magnetic velocity curve and the working fluid velocity curve or profile 40.

The average velocity $\Delta V'_{AVG}$ as measured between magnetic velocity curve 70 and fluid velocity curve 40 from the entrance region to the exit region is substantially less than the $\Delta V_{MAX}$ which is developed by known prior art MHD generators. Further, curve 70 is a smooth, linear curve rather than a stepped curve or another curve having an irregular geometry as developed by prior art MHD generators. Therefore, the electrical efficiency of the improved alternating current MHD generator 12 of the invention is substantially improved, and an essentially constant power density is developed through the channel 30.

FIGURE 5 shows asymmetrical travelling magnetic waves 100 and 102 developed by the energization of one form of improved stator region such as shown by FIGURE 3. The improved stator region had twelve slots with continuously varying slot pitches, and the following dimensions:

| | | |
|---|---|---|
| Stator region length | inches | 8 |
| Stator region width: | | |
|     Entrance region | do | 1.5 |
|     Exit region | do | 2.5 |
| Slot dimensions: | | |
|     Maximum | do | 0.417 by 1.25 |
|     Minimum | do | 0.261 by 1.25 |
| Stator windings, number of conductors per slot | | 50 |

The foregoing example is given as an indication of the operating dimensions found desirable for one form of improved stator region. The example is offered to assure a working understanding of the present invention and is not to be interpreted as limiting the scope of the invention. At time instant ($wt_0$), asymmetrical curve 100 was developed and at a later time instant ($wt_1$), curve 102 was developed. Curves 100 and 102 are separated by a time interval $t_1-t_0$, and are travelling from the entrance region to the exit region of the MHD generator. However, the wave velocity of each curve continuously decreases from the entrance region to the exit region in accordance with the present invention as described and shown. Thus, the distances between the adjacent "peaks" of curves 100 and 102 continuously decrease dimensionally from the entrance region to the exit region so that the distance $D_1$ between the adjacent peaks of curves 100 and 102 when separated by a time interval $t_1-t_0$ is greater than distance $D_2$, $D_2$ is greater than $D_3$, and $D_3$ is greater than $D_4$, i.e., $D_1>D_2>D_3>D_4$. Therefore, the wave velocities of asymmetrical curve 100 and 102 are continuously decreasing dimensionally at least in the MHD generator region.

Referring to FIGURE 6, another form of stator region 110 develops a magnetic field velocity that is continuously decreasing from the entrance region to the exit region as represented by an asymmetrical curve, such as curve 96 as shown by FIGURE 4. By the proper selection of variable inductance ($L_1$, $L_2$ . . . $L_n$) and variable capacitance ($C_1$, $C_2$ . . . $C_n$) at different sections of the stator region 110 in accordance with transmission line theory, an asymmetrical travelling magnetic wave is developed when voltage V is applied to the stator region 110 and regulated by a conventional power regulator 112 that receives an input signal from a conventional flow meter 114 associated with the channel 30 of the improved alternating current MHD generator. A terminating impedance, represented as Z, can be used with the variable inductance and capacitance of the stator region 110. The resulting asymmetrical travelling magnetic wave has a continuously decreasing wave velocity that can be accurately matched to the decreasing working fluid velocity in channel 30 so that the resulting magnetic velocity curve is similar to the magnetic velocity curve 70 as shown by FIGURE 2.

It is also contemplated that the asymmetrical travelling magnetic wave, such as curve 96 of FIGURE 4, can be developed by using stator windings arranged in a helical form with a variable pole pitch from the entrance region to the exit region of the MHD generator.

As will be evidenced from the foregoing description, certain aspects of the invention are not limited to the particular details of construction as illustrated, and it is contemplated that other modifications and applications will occur to those skilled in the art. It is, therefore, intended that the claims shall cover such modifications and applications that do not depart from the true spirit and scope of the invention.

We claim:
1. A stator region for an alternating current magnetohydrodynamic generator comprising:
   (a) a generator section core means generally defining an entrance region and a downstream exit region,
   (b) at least first and second stator means cooperating with said generator section core means, said stator means comprising:
      (i) a plurality of alternate stator teeth and slots, selected ones of said stator teeth and slots continuously decreasing dimensionally from said entrance region to said downstream exit region, and
      (ii) suitable stator windings positioned in said stator slots,
   (c) a source of electrical power connected to said stator windings of said first and second stator means, and
   (d) at least first and second stator phase belts developed by respective ones of said first and second stator means,
   (e) said first and second stator phase belts continuously decreasing dimensionally from said entrance region to said exit region so that the velocity of a resulting travelling magnetic wave set up by said first and second stator means continuously decreases asymmetrically from said entrance region to said downstream exit region.

2. The stator region of claim 1 in which said first and second stator means comprise at least first and second pairs of inductance and capacitance electrically connected and having predetermined electrical values so that said inductance and capacitance develop said first and second stator phase belts.

3. The stator region of claim 1 in which said generator section core means comprises at least first and second generator sections.

4. The stator region of claim 3 in which each of said first and second generator sections has at least first and second stator means cooperating therewith.

5. The stator region of claim 1 in which said source of electrical power is polyphase.

References Cited
UNITED STATES PATENTS

| | | | |
|---|---|---|---|
| 2,992,345 | 7/1961 | Hansen | 313—63 |
| 3,102,224 | 8/1963 | Maeder | 322—47 |
| 3,138,019 | 6/1964 | Fonda-Bonardi | 73—147 |

DAVID X. SLINEY, Primary Examiner

U.S. Cl. X.R.

310—12